United States Patent [19]

Chang et al.

[11] Patent Number: 5,340,509
[45] Date of Patent: Aug. 23, 1994

[54] PROCESS FOR PELLETIZING ULTRA HIGH MELT FLOW CRYSTALLINE POLYMERS AND PRODUCTS THEREFROM

[75] Inventors: David S. Chang, Houston, Tex.;
Aaron S. Rhee, Belle Mead, N.J.;
Ronald K. Crossland, Houston, Tex.;
Jorge O. Bühler-Vidal, North Brunswick, N.J.

[73] Assignee: Shell Oil Company, Houston, Tex.

[21] Appl. No.: 906,328

[22] Filed: Jun. 30, 1992

[51] Int. Cl.⁵ .................................. B29B 9/10
[52] U.S. Cl. ........................... 264/5; 264/8; 264/13; 528/481; 528/502
[58] Field of Search ............ 528/502, 481; 523/223, 523/331; 264/5, 13, 299, 8

[56] References Cited

U.S. PATENT DOCUMENTS

| | | | |
|---|---|---|---|
| 2,790,201 | 4/1957 | Eilbracht et al. | 264/13 |
| 3,079,370 | 2/1963 | Precopio et al. | 528/502 |
| 3,208,101 | 9/1965 | Kaiser et al. | 264/13 |
| 3,341,087 | 9/1967 | Rosin et al. | 264/5 |
| 3,702,748 | 11/1972 | Storb et al. | 264/13 |
| 4,154,379 | 5/1979 | Schermutzki | 264/13 |
| 4,279,579 | 7/1981 | Froeschke | 264/13 |
| 4,610,615 | 9/1986 | Froeschke | 264/13 |
| 4,623,307 | 11/1986 | Froeschke | 425/8 |
| 4,963,084 | 10/1990 | Froeschke | 425/331 |

FOREIGN PATENT DOCUMENTS

| | | |
|---|---|---|
| 363975 | 10/1988 | European Pat. Off. . |
| WO92/03280 | 3/1992 | PCT Int'l Appl. . |

*Primary Examiner*—Joseph L. Schofer
*Assistant Examiner*—Tom Weber
*Attorney, Agent, or Firm*—Otto O. Meyers, III

[57] ABSTRACT

Disclosed is a process for pelletizing ultra high melt flow crystalline polymers to produce dust-free, uniform ultra high melt flow crystalline pellet products. The process comprises feeding polymer into melting/mixing means, resulting in molten polymer. The molten polymer is transferred to a droplet forming means that produces droplets of the molten polymer. The droplets collect on a continuously moving cooling conveyer and solidify to form dust-free, uniform ultra high melt flow crystalline polymer pellets. Further, the process produces ultra high melt flow crystalline polymer pellets which are uniformly compounded.

5 Claims, No Drawings

PROCESS FOR PELLETIZING ULTRA HIGH MELT FLOW CRYSTALLINE POLYMERS AND PRODUCTS THEREFROM

FIELD OF THE INVENTION

This invention relates to a process for pelletizing ultra high melt flow crystalline polymers. More particularly, the invention relates to the production of uniformly compounded, dust-free ultra high melt flow crystalline polyolefin polymer pellets that have high bulk density.

BACKGROUND OF THE INVENTION

An ultra high melt flow (UHMF) grade crystalline polymer has a melt flow (MF) of about 50 dg/min or greater. The MF of a UHMF crystalline polymer can be as high as 15,000 or greater. UHMF polymers in the range of about 1000–2000 are particularly useful for the production of non-woven fabrics by melt blown fiber processes. In order to employ UHMF polymers in commercial processing equipment, it is desirable to utilize the UHMF polymer as a pellet feed stock.

Pelletization of polymers using conventional pelletization systems is a well known method of providing a pellet feedstock. However, crystalline polypropylenes that have a MF of about 50 dg/min or greater are particularly difficult to pelletize. Due to the low melt strength of such UHMF crystalline polymers, attempts to pelletize UHMF polypropylenes with conventional pelletization systems, including underwater pelletization systems, result in an excess amount of non-uniform pellets, malformed pellets, pellet trash and high levels of "fines". Deformation of the polymer pellet is caused by water currents created by rotating knives of the underwater pelletization system. Malformed and non-uniform pellets are undesirable since they tend to bridge in pellet feed hoppers and convey poorly (e.g., plug conveying filters). Further, significant amounts of malformed pellets alter the bulk density of the pellet stock may result in feeding problems in the extrusion line and voids in the final product. In addition to malformed pellets, "trashouts" occur frequently during the production of UHMF crystalline polymers. Trashouts are extruder shutdowns resulting from polymer buildup on the rotating knives. Such trashouts not only necessitate the consumption of enormous labor and time but induce deterioration of the quality of polyolefin polymer pellets being produced.

It has long been desired to find a continuous process for pelletizing UHMF crystalline polymers to produce uniform, dust-free crystalline polymer pellets having narrow molecular weight distribution. In particular, it is desired to find a high speed continuous process for pelletizing crystalline polymers, such as isotactic polypropylenes, that have a melt flow greater than 50 dg/min.

Further, it is desired to find a process for pelletizing UHMF crystalline polymers that contain a uniform dispersement of the desired additives and are substantially cracked to produce uniformly compounded pellets having high bulk density.

SUMMARY OF THE INVENTION

The present invention relates to a novel continuous high speed process of pelletizing ultra high melt flow (UHMF) crystalline polymers and to the pellet products produced thereby. More particularly, the process comprises the steps of feeding the polymer into melting/mixing means to provide a molten polymer material. The molten polymer is transferred to a droplet forming means that produces droplets of the molten polymer. The droplets collect on a continuously moving cooling conveyer and solidify to form dust-free, uniform ultra high melt flow crystalline polymer pellets which have high bulk density. Further, the process is capable of producing uniformly compounded dust-free UHMF crystalline polymer pellets that are semi-spherical in shape and have high bulk density.

DETAILED DESCRIPTION OF THE INVENTION

The process of the present invention is particularly useful in pelletizing crystalline thermoplastic polymers having a melt flow of at least 50 dg/min (as determined using ASTM D1238, Condition L). It is preferred that the crystalline polymer have a melt flow of at least about 100 dg/min. Crystalline polymers having a melt flow of at least about 450 dg/min are more preferred, with polymers having a melt flow of greater than about 1000 dg/min being most preferred. Prior to pelletization, the crystalline polymer introduced to the process can have the desired MF or it can be converted in the extruder to a UHMF crystalline polymer by the addition of peroxide.

Other methods of providing a pellet feedstock for further processing are known. One such method involves coating polymer pellets or granules of a cracked polymer resin having a melt flow in the range from about 200 dg/min to about 400 dg/min with an amount of peroxide sufficient to crack the resin to higher melt flows during further processing, such as fiber spinning. In addition to the peroxide, one or more additives may be added during the coating. The coating process has the disadvantage that the granular resin or pellets are not uniformly coated and therefore, results in a polymer product having non-uniform melt flow and additive dispersion.

The crystalline UHMF polymer to be pelletized in accordance with the invention can be any crystalline polymer which is a polyolefin homopolymer having 2-18 carbon atoms in the repeat unit, a polyolefin copolymer having at least one comonomer that has repeat units having 2-18 carbon atoms, or blends of such polymers. Exemplary of suitable crystalline polymers are polypropylene, polybutylene, polyethylene, ethylene-propylene copolymers, and propylene-butene-1 copolymers and blends thereof.

The UHMF crystalline polymer is fed into melting mixing means, such as an extruder, mixer or heated mixing container, that melts the crystalline polymer to provide a uniform molten polymer material. The molten crystalline polymer material is transferred under a positive pressure from about 30 psi to about 360 psi, supplied from any transferring means such as a positive displacement gear pump, and at a feed temperature in the range from about 360° F. to about 600° F., to a droplet forming means. A feed temperature from about 380° F. to about 520° F. is preferred, with a feed temperature from about 400° F. to about 500° F. being more preferred. The droplet forming means forms droplets of the molten polymer material which are cooled, resulting in solid, uniform UHMF crystalline polymer pellets that are semi-spherical in shape.

The droplet forming means suitable for use in the novel process is capable of forming droplets of molten polymer material contained therein. In accordance with one embodiment of the invention, the droplet forming means is as a ROTOFORMER ® dropformer system, manufactured by Sandvik Process Systems. Such dropformer systems are described in numerous patents, including Froeschke (U.S. Pat. No. 4,623,307) and Froeschke II (U.S. Pat. No. 4,963,084), both of which are incorporated by reference. The dropformer system is used in conjunction with a cooling conveyer belt such as a steel cooling belt, manufactured by Sandvik Process Systems. UHMF crystalline polymer is feed into a heated extruder to produce a molten polymer material. The molten polymer material is transferred to the ROTOFORMER via a variable speed displacement pump. The ROTOFORMER dropformer comprises two coaxial cylindrical containers, namely an inner container and an outer container. The outer container rotates around the inner container and is provided with circumferentially spaced orifices on its periphery. The inner container is equipped with a channel facing the cooling belt located under the ROTOFORMER. The channel has an internal heating means. Under pressure the molten polymer material flows into the inner container channel of the ROTOFORMER system. As the outer container rotates, the circumferential orifices in the outer container align cyclically with the inner container's channel allowing a uniform amount of molten UHMF polymer material to emerge as droplets which are collected onto a cooling conveyer.

The cooling conveyer moves in a direction tangential to the direction of rotation of the outer container and at a high velocity that is synchronized with the rotating velocity of the outer container. The cooling conveyor belt operates at a speed in the range from about 20 feet/min to about 360 feet/min. It is preferred that the cooling conveyor operate at a speed in the range from about 50 feet/min to about 280 feet/min, with a speed in the range from about 100 ft/min to about 275 ft/min being more preferred. The rotation of the outer container and the velocity of the cooling conveyer is such that the ratio of the velocity of the cooling conveyer to the rotational velocity of the outer container of the dropformer to is from about 0.5 to about 3. A ratio in the range from about 1 to about 3 is preferred, with a ratio in the range from about 1 to about 2 is being most preferred.

According to another embodiment of the invention, the molten UHMF crystalline polymer is transferred under pressure to a droplet forming means such as a PASTILLIER-AUTOMAT, and other droplet forming means, described in WO9203280-A and WO9003839 and incorporated herein by reference, each manufactured by Geber Kaiser-Krefeld. The PASTILLIER-AUTOMAT comprises a trough having exit nozzles at the bottom of the trough and plungers/teeth at the top of the trough. The plungers/teeth continuously move up and down to contact the exit nozzles. As molten polymer enters the trough, the plungers/teeth move down through the molten polymer to force a uniform amount of the molten polymer through the exit nozzles. The molten polymer drops onto a cooling conveyor and solidifies to form uniform, dust-free, semi-spherical crystalline polymer pellets.

It is within the scope of the invention to pelletize a crystalline polymer that has been cracked to a desired ultra high melt flow by the addition of a sufficient amount of peroxide to the crystalline polymer in the melting/mixing means, such as an extruder. The desired melt flow for the molten crystalline polymer material that is to transferred from the melting/mixing means is determined and controlled to the desired value by controlling the temperature of the melting/mixing means, the amount of peroxide added to the melting/mixing means and residence time in the melting/mixing means. By appropriate control of such parameters the desired melt flow for the crystalline polymer is attained while the polymer is in a molten state within the melting/mixing means. As such, the molten polymer material is at the desired melt flow value when it is supplied to the droplet forming means.

The production of uniformly compounded, dust-free crystalline polymer pellets is contemplated within the scope of the invention. The additive or combination of additives, whose provision to the UHMF crystalline polymer is desired to produce a uniformly compounded product, is added with the crystalline polymer material to the melting/mixing means, such as an extruder. Additives that are suitable for the pelletization process include additives which are conventionally employed to improve or modify the processability and properties of the UHMF crystalline polymer. Exemplary of the additives that are useful in the practice of the invention include but are not limited to antioxidants, processing stabilizers, acid acceptors, nucleating agents, metal deactivating agents, thermal stabilizers, light or ultraviolet stabilizers, antiblock agents, antistatic agents, lubricants and slip agents which are capable of enhancing the properties and processability of the polymer and the like. Other additives which are useful within the scope of this invention include fillers, pigments and flame retardants.

According to another embodiment of the invention, crystalline polymer powder, sufficient amount of at least one additive to obtain a crystalline polymer having desired processability and properties and sufficient quantity of peroxide to crack the polymer powder to a desired higher melt flow are added to melting/mixing means, such as an extruder. Pelletization of the resulting molten crystalline polymer material according to the invention provides a substantially cracked, uniformly compounded molten polymer material.

The flexibility of making a wide range of uniform, semi-spherical pellets is another advantage of the present invention. Pellet sizes range from about 0.5 mm to about 20 mm in diameter. It is preferred that the pellet size range from about 1 mm to about 13 mm, with a pellet size range from about 4 mm to about 10 mm being more preferred.

The process of the present invention successfully produces dust-free polymer pellets. In accordance with the present invention, fine levels less than 0.12 wt %, based on total weight of collected crystalline polymer pellets, are obtained. Fine levels less than 0.09 wt % are preferably obtained, with fine levels less than 0.05 wt % being more preferred. The resulting uniformly compounded, dust-free, semispherical pellets have the advantage of smooth pellet handling, uniform bulk density, and uniform additive dispersion.

Although the present invention has been described in connection with the herein described embodiments, it will be appreciated by those skilled in the art that modifications, additions, substitutions, and deletions not specifically described may be made without departing from the spirit and scope of the invention.

The invention is further illustrated by the following Illustrative Embodiments which should not be regarded as limiting.

ILLUSTRATIVE EMBODIMENT I (EXAMPLE 1)

A dry blend of isotactic polypropylene in powder form (45.4 kg) and an additive package containing IRGANOX ® 3114 Antioxidant, a primary hindered phenolic antioxidant (800 ppm), and zinc oxide, an acid acceptor (200 ppm), was prepared by tumbling in a blender. After thorough blending, the isotactic polypropylene blend was continuously metered into a Welex single-screw extruder to produce a molten polymer material. Using a Viking variable speed gear pump, the molten polymer material was pumped into a 24 inch Rotoformer dropformer, Model 02734-88, manufactured by Sandvik Process Systems, Totowa, N.J. under a pressure of about 40 psi. The feed temperature of the molten polymer material at the entry of the Rotoformer was about 390° F. to about 410° F. The molten polymer material was dropformed in the form of droplets onto a continuously moving steel cooling belt, also manufactured by Sandvik Process Systems. The velocity ratio of the cooling conveyor and the outer container of the rotoformer was about 2. The molten polymer droplets solidified on the cooling belt to provide uniform, dust-free, semi-spherical ultra high melt flow pellets which were conveyed to a collection bin.

Efficacy of the process in producing a uniformly compounded, dust-free polymer product was evaluated by measuring the fines present in the collected final pellet product. The fines were separated from the pellets by separating the final pellet product with a K-Tron separator using a 16 mesh size screen and weighing the fines collected. The results are shown in Table I.

ILLUSTRATIVE EMBODIMENT II (EXAMPLES 2-9)

Dry blends of isotactic polypropylene in powder form (45.4 kg), an additive package containing IRGANOX ® 3114 Antioxidant (800 ppm), zinc oxide (200 ppm) AND ULTRANOX ® Stabilizer 626A (350 ppm), a phosphite process stabilizer and sufficient quantities of peroxide (Lupersol ® 101) to crack the polypropylene to a desired higher melt flow, were prepared by tumbling the components in a blender. After thorough blending, the polypropylene blends were pelletized and efficacy determined in the same manner as described in Illustrative Embodiment I. The results are shown in Table I.

TABLE I

| Example No. | MF[1,2] Polypropylene Powder | Lupersol ® 101 ppm | | Fines (% wgt.) |
|---|---|---|---|---|
| 1 | 1000 | — | 1,008 | 0.08 |
| 2 | 55 | 2,000 | 710 | 0.06 |
| 3 | 400 | 800 | 1,705 | 0.05 |
| 4 | 400 | 600 | 964 | 0.09 |
| 5 | 800 | 400 | 1,681 | 0.03 |
| 6 | 800 | 400 | 1,398 | 0.05 |
| 7 | 1000 | 200 | 1,398 | 0.04 |
| 8 | 2000 | 200 | 2,537 | 0.02 |
| 9 | 2000 | 200 | 2,568 | 0.02 |

[1]Melt flow of isotactic polypropylene powder prior to extrusion.
[2]45.4 kg of propylene used in each polymer composition.
[3]Melt flow of fully compounded, isotactic polypropylene pellet determined with 0.5 wt% ULTRANOX ® 246 antioxidant to retard degradation during measurement, in ASTM D1238, Condition L.

ILLUSTRATIVE EMBODIMENT III (Examples 10–11)

Dry blends of random copolymer (45.4 kg) comprising propylene and ethylene (5% by weight), an additive package containing IRGANOX® 3114 (800 ppm), zinc oxide (200 ppm) and ULTRANOX ® 626A stabilizer (350 ppm), were prepared by tumbling the components in a blender (Example 11 further comprised 200 ppm of Lupersol ®101 to crack the random copolymer to a desired higher melt flow). After thorough blending, the random copolymer blends were pelletized and efficacy determined in the same manner as described in Illustrative Embodiment I. The results are shown in Table II.

TABLE II

| Example No. | Melt Flow of[1] Random Copolymer Powder | Lupersol ® 101 ppm | Melt[2] Flow | Fines (% wgt.) |
|---|---|---|---|---|
| 10 | 1300 | — | 1,394 | 0.01 |
| 11 | 1352 | 200 | 1,423 | 0.04 |

[1]Melt flow of isotactic polypropylene powder prior to extrusion.
[2]Melt flow of fully compounded random copolymer pellet determined by ASTM D1238 (Condition L), using 0.5 wt% ULTRANOX ® 246, an antioxidant to retard degradation during measurement.

What is claimed:

1. A continuous process for forming dust-free, semi-spherical pellets from ultra high melt flow crystalline thermoplastic polymers comprising the steps of:
    feeding the polymer into melting/mixer means
    melting the crystalline polymer in the melting/mixer means to provide a molten ultra high melt flow crystalline polymer material;
    transferring the molten ultra high melt flow polymer material under a positive pressure and at a temperature in the range from about 360° F. to about 600° F. to droplet forming means comprising coaxial inner and outer cylindrical containers wherein the outer container which has orifices align cyclically with the inner container, rotates around the inner container;
    forming droplets of the molten polymer with the droplet forming means wherein the outer container having orifices rotates around the inner container to allow a uniform amount of molten ultra high melt flow polymer material emerge as droplets which are collected onto a cooling conveyer, wherein the ratio of the velocity of the cooling conveyer to the rotational velocity of the outer container of the droplet forming means is from about 0.5 to about 3; and
    cooling the droplets for a time sufficient to solidify the droplets and form dust-free, semi-spherical pellets.

2. The process according to claim 1, further comprising the step of increasing the melt flow of the polymer in the melting/mixer means by feeding peroxide to the melting/mixer means, wherein the polymer is selected from the group consisting of polypropylene, polybutylene, propylene-ethylene copolymers, propylene-butene copolymers and blends thereof.

3. A continuous high speed process for pelletizing ultra high melt flow crystalline thermoplastic polymers having a melt flow of at least 50 dg/min and selected from the group consisting of polypropylene, polybutylene, propylene-butene copolymers, propylene-ethylene copolymers and blends thereof, comprising the steps of:

feeding peroxide and polymer into an extruder;

melting and cracking the crystalline polymer in the extruder to provide a cracked higher melt flow molten polymer material;

transferring the cracked, molten polymer material at a pressure in the range of about 30 psi to about 360 psi and a temperature in the range from about 360° F. to about 600° F. to droplet forming means comprising coaxial inner and outer cylindrical containers;

forming droplets of the molten polymer material with the droplet forming means onto a cooling conveyer; and cooling the droplets on the cooling conveyer for a time sufficient to solidify the droplets and form dust-free, semi-spherical pellets.

4. The process according to claim 3, wherein the ultra high melt flow crystalline polymer is selected from the group consisting of polyolefin homopolymer having 2-18 carbon atoms in repeat unit, polyolefin copolymer having at least one comonomer that has repeat units having 2-18 carbon atoms and blends thereof.

5. The process according to claim 4, wherein the ultra high melt flow crystalline polymer is selected from the group consisting of polypropylene, polybutylene, copolymers of propylene-ethylene, copolymers of propylene-butene-1, and blends thereof.

* * * * *